(12) United States Patent
Marsh

(10) Patent No.: US 8,261,731 B2
(45) Date of Patent: Sep. 11, 2012

(54) COOKING DEVICE AND ASSOCIATED METHODS

(76) Inventor: Brian E. Marsh, Lancaster, CA (US)

( * ) Notice: Subject to any disclaimer, the term of this patent is extended or adjusted under 35 U.S.C. 154(b) by 578 days.

(21) Appl. No.: 12/330,031

(22) Filed: Dec. 8, 2008

(65) Prior Publication Data

US 2009/0314285 A1 Dec. 24, 2009

Related U.S. Application Data

(60) Provisional application No. 61/074,371, filed on Jun. 20, 2008.

(51) Int. Cl.
*F24B 3/00* (2006.01)
*F24C 1/16* (2006.01)
*F24C 3/14* (2006.01)
*F24C 5/20* (2006.01)
*F24C 7/10* (2006.01)

(52) U.S. Cl. .................................................. 126/25 R
(58) Field of Classification Search .................. 126/9 R, 126/9 B, 38, 19 R, 25 R, 29, 59; 110/239; 206/546, 547, 577; 99/449; *F24B 3/00; F24C 1/16, F24C 3/14, 5/20, 7/10*
See application file for complete search history.

(56) References Cited

U.S. PATENT DOCUMENTS

| | | | | |
|---|---|---|---|---|
| 306,599 A | * | 10/1884 | Fagan | 220/6 |
| 316,914 A | * | 4/1885 | Ringen | 126/275 R |
| 1,016,565 A | * | 2/1912 | Huenefeld | 126/275 R |
| 1,018,116 A | * | 2/1912 | Kowalski | 99/421 M |
| 1,238,142 A | * | 8/1917 | Hitchcock | 126/29 |
| 1,333,335 A | * | 3/1920 | O'Kane | 126/29 |
| 1,626,035 A | * | 4/1927 | Hanson | 126/38 |
| 2,124,837 A | * | 7/1938 | Anthony | 99/389 |
| 2,408,859 A | * | 10/1946 | Leake, Jr. | 126/9 R |
| 2,511,515 A | * | 6/1950 | Schmitt | 126/9 R |
| 2,646,031 A | * | 7/1953 | Wagner | 126/9 R |
| 2,698,646 A | * | 1/1955 | Hepworth | 126/204 |
| 3,059,568 A | * | 10/1962 | Fortis | 99/340 |
| 3,308,807 A | * | 3/1967 | Little et al. | 126/275 R |
| 3,327,699 A | * | 6/1967 | Uden | 126/25 R |
| 3,682,154 A | * | 8/1972 | Mollere | 126/9 A |
| 3,999,472 A | * | 12/1976 | Einto | 99/340 |
| 4,256,080 A | * | 3/1981 | Seach | 126/25 R |

(Continued)

FOREIGN PATENT DOCUMENTS

JP   11051396 A * 2/1999

(Continued)

*Primary Examiner* — Steven B McAllister
*Assistant Examiner* — Daniel E Namay
(74) *Attorney, Agent, or Firm* — Mark R. Malek, Esq.; G. Philip J. Zies, Esq.; Zies Widerman & Malek

(57) ABSTRACT

A cooking device comprises a center assembly including a rear panel and a pair of opposing side panels hingedly connected to the rear panel. The center assembly may be movable between an expanded position and a collapsed position. The cooking device also includes a front panel, a top panel and a diffuser plate carried by the center assembly when the center assembly is in the expanded position, and a cooking surface carried by the center assembly when the center assembly is in the expanded position. The center assembly, front panel, top panel, diffuser plate and cooking surface collapsed so that the center assembly, front panel, top panel, diffuser plate and cooking surface may be transported in a substantially flat configuration.

14 Claims, 10 Drawing Sheets

U.S. PATENT DOCUMENTS

| | | | | |
|---|---|---|---|---|
| 4,457,290 A | * | 7/1984 | Edwards | 126/9 R |
| 4,508,096 A | * | 4/1985 | Slattery | 126/9 R |
| 4,512,477 A | * | 4/1985 | Densen | 206/577 |
| 4,677,964 A | * | 7/1987 | Lohmeyer et al. | 126/41 R |
| 4,878,476 A | * | 11/1989 | Oliphant | 126/9 R |
| 4,924,844 A | * | 5/1990 | Bransburg | 126/9 R |
| 5,243,961 A | * | 9/1993 | Harris | 126/9 R |
| 5,499,574 A | * | 3/1996 | Esposito | 99/339 |
| 5,921,229 A | | 7/1999 | Blake | |
| 6,467,474 B2 | * | 10/2002 | Hermansen et al. | 126/25 R |
| 6,546,845 B1 | | 4/2003 | Lanzilli | |
| 6,591,828 B1 | | 7/2003 | Schneider | |
| 6,644,298 B2 | * | 11/2003 | Hermansen et al. | 126/25 R |
| 6,681,757 B1 | * | 1/2004 | Rivero | 126/9 R |
| 6,708,604 B1 | | 3/2004 | Deichler, Jr. | |
| 6,935,326 B1 | * | 8/2005 | Willis | 126/9 R |
| 6,973,927 B1 | * | 12/2005 | Stewart | 126/98 |
| 7,934,494 B1 | * | 5/2011 | Schneider | 126/241 |

FOREIGN PATENT DOCUMENTS

WO      WO 9937955 A1 * 7/1999

* cited by examiner

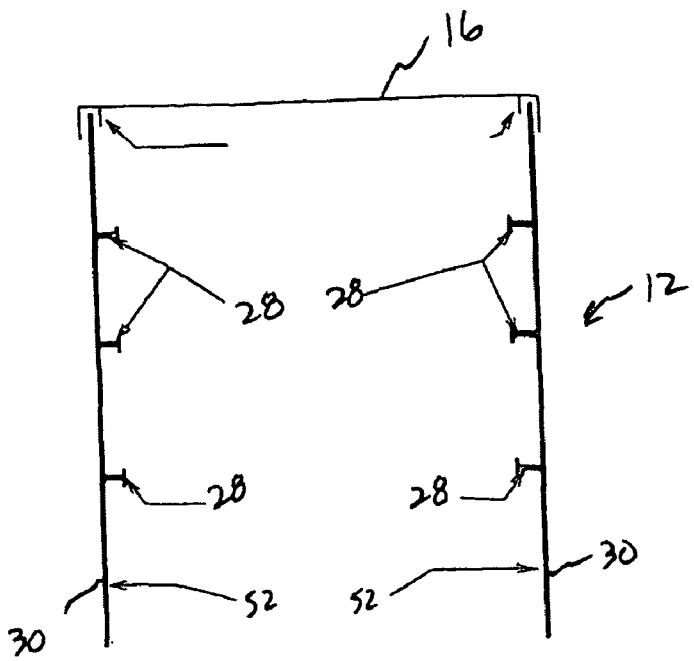
Fig. 8
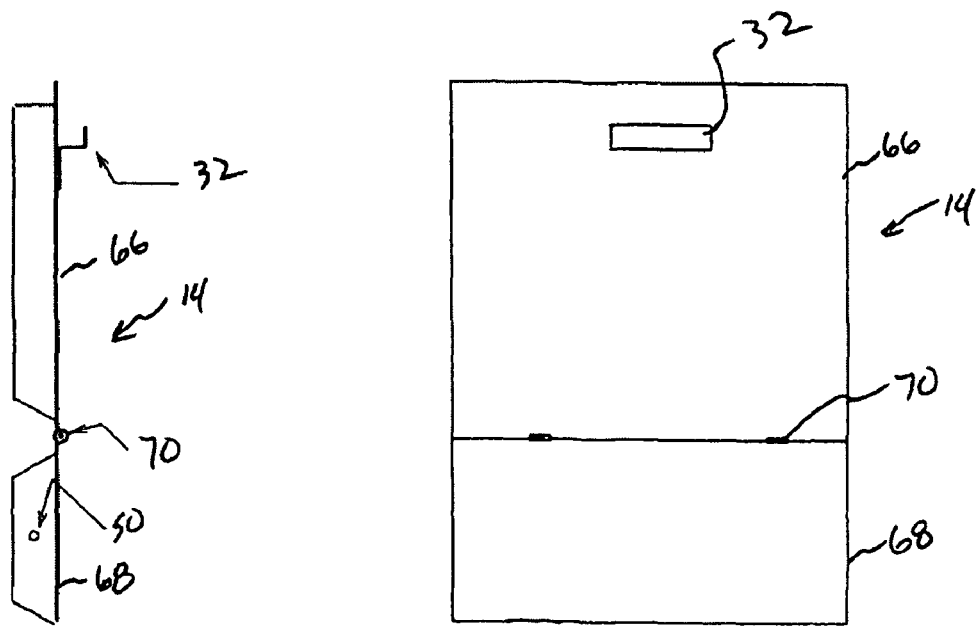
Fig. 9
Fig. 10

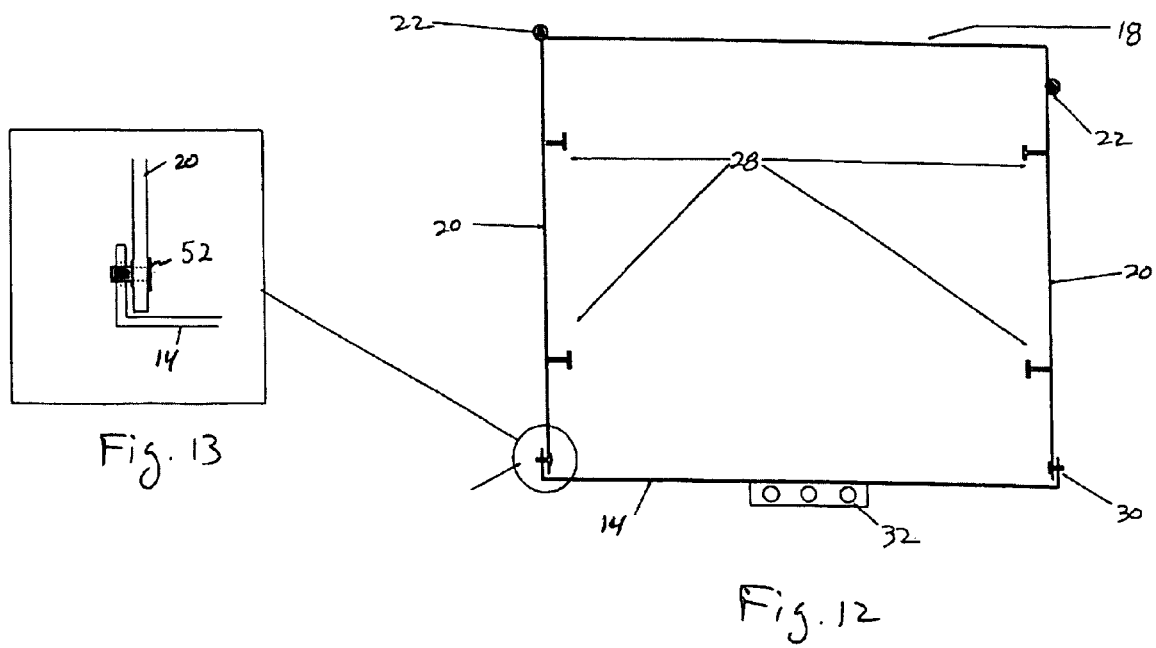

COOKING DEVICE AND ASSOCIATED METHODS

RELATED APPLICATIONS

This application claims the benefit of U.S. Provisional Patent Application Ser. No. 61/074,371 titled Backpacker Oven filed on Jun. 20, 2008, the entire contents of which are incorporated herein by reference.

FIELD OF THE INVENTION

The present invention relates to the field of cooking devices and, more particularly, to the field of portable cooking devices that are collapsible to conserve space for transport in a backpack.

BACKGROUND OF THE INVENTION

In the field of camping, there is a need for a lightweight, portable, folding cooking device. This is particularly necessary for backpacking applications. More specifically, when engaging in the activity of backpacking, space for transporting items necessary during wilderness camping comes at a premium. In addition to the size of an item, the weight of an item may also play a major role in determining whether or not the item may be carried in the backpack.

It is especially essential when engaging in the activity of backpacking to reduce weight to be carried by the user. Equipment should generally be compact when not in use so as to fit into the confines of a backpack. Of course, when backpacking, certain foods have not generally been available due to the need to bake such foods. For example, pizzas, biscuits, cookies, muffins or any other foods that could be baked at home are normally difficult to be baked in the wilderness, especially without use of a stove.

Most devices used for camping stove applications include a single burner type oven apparatus. Other devices used for wilderness cooking applications may use wood as a heating fuel. In most wilderness areas, however, open fires are not permitted. Accordingly, several portable devices that may normally have been used for cooking applications may be prohibited in some wilderness areas.

U.S. Pat. No. 6,708,604 to Deichler, Jr. discloses a collapsible smoker and oven device. The device includes a center assembly having a rear panel and two side panels hingedly connected thereto. A front panel having a lower door, a medial door, and an upper door is hingedly connected to one of the side panels. The side panels include a plurality of vents and the unit may be collapsed flat. The fire box may be moved to various positions so that the device may be used as a grill, smoker or oven. This device, however, includes several loose pieces that may require a complicated assembly process.

U.S. Pat. No. 6,591,828 to Schneider discloses a collapsible camp oven, stove top and grill. More specifically, the unit includes a top, a bottom and side walls that are adapted to be positioned between the top and the bottom. Once collapsed, the device may be taken apart into several pieces and positioned to be contained within the top and bottom which interlock with one another. Similar to the device disclosed in the Deichler, Jr. '604 patent, this device may include several loose pieces and require a somewhat complicated assembly.

U.S. Pat. No. 5,921,229 to Blake discloses a portable cooking and heating device. The device includes a center assembly, and an external burner positioned adjacent the center assembly. The center assembly must be taken apart into several pieces in order to be collapsed. U.S. Pat. No. 6,546,845 to Lanzilli discloses a collapsible rotisserie grill and oven combination. The unit includes folding side panels that may be collapsed, but does not lie flat, and is likely not suitable for backpacking applications.

Accordingly, there is a need for a lightweight, functional cooking device for backpacking applications. More specifically, there exists a need for a collapsible cooking device that may be readily transported in a relatively small storage space and easily assembled with little complications and in a short amount of time. Further, there exists a need for a portable cooking device that may be assembled and disassembled while-minimizing the possibility of losing loose parts.

SUMMARY OF THE INVENTION

In view of the foregoing background, it is therefore an object of the present invention to provide a lightweight cooking device that is readily collapsible and may be stored in a small storage space. It is also an object of the present invention to provide a collapsible and portable cooking device that may be readily assembled and disassembled in a short period of time. It is further an object of the present invention to provide a cooking device that may be readily assembled and disassembled without the need of excessive loose parts.

These and other objects, features, and advantages of the present invention are provided by a cooking device comprising a center assembly, a front panel and a top panel. The center assembly preferably includes a rear panel and a pair of opposing side panels that are hingedly connected to the rear panel. The center assembly is preferably movable between an expanded position and a collapsed position. The front panel may be removably connected to the center assembly. The top panel may be removably connected to the center assembly and the front panel.

The cooking device may also include a diffuser plate carried by the center assembly when the center assembly is in the expanded position. The cooking device may further include a cooking surface carried by the center assembly when the center assembly is in the expanded position. The cooking surface may be positioned to overlie the diffuser plate when the center assembly is in the expanded position. The center assembly, front panel, top panel, diffuser plate and cooking surface may collapse so that the center assembly, front panel, top panel, diffuser plate and cooking surface may be transported in a substantially flat configuration.

The cooking device may also include a respective plurality of supports connected to the side panels. The diffuser plate and the cooking surface may be carried by the supports when the center assembly is in the expanded position. Accordingly, the cooking device advantageously allows a user to assemble the center assembly, front panel and top panel with very few loose parts and also advantageously allows a user to position the diffuser plate and cooking surface as desired using the supports.

The cooking device may also include a handle carried by the front panel. The pair of opposing side panels may include vents formed therein. Similarly, the front panel may include a vent formed therein. A thermometer may be carried by one of the pair of opposing side panels to advantageously allow a user to monitor a temperature within the cooking device. The front panel may include an upper front panel and lower front panel that are hingedly connected to the upper front panel. Accordingly, the upper front panel may define a door.

The top panel may include a top panel vent formed therein. The cooking device may also include a top vent cover positioned to overlie the top panel vent formed in the top panel. The top vent cover may be movable between an open position and a closed position. This advantageously allows a user to control the vent, thereby allowing for the various cooking environments.

A method aspect of the present invention is for using a cooking device. The method includes moving the center assembly from a collapsed position to an expanded position, connecting the front panel to the center assembly, connecting the top panel to upper portions of the center assembly and the front panel using a plurality of fasteners and disassembling the top panel and front panel from the center assembly. The method may also include collapsing the center assembly and arranging the collapsed center assembly, the front panel and the top panel in a substantially flat configuration.

BRIEF DESCRIPTION OF THE DRAWINGS

FIG. 8 is a front elevation view of the cooking device illustrated in FIG. 1 having the front panel removed.

FIG. 9 is a side elevation view of the front panel of the center assembly of the cooking device illustrated in FIG. 1.

FIG. 10 is a front elevation view of the front panel illustrated in FIG. 9.

FIG. 12 is a top plan view of the cooking device illustrated in FIG. 1 having the top panel removed.

FIG. 13 is a detailed view of a connection between the front panel and the side panels of the center assembly of the cooking device according to the present invention.

DETAILED DESCRIPTION OF THE PREFERRED EMBODIMENT

Figure 1:
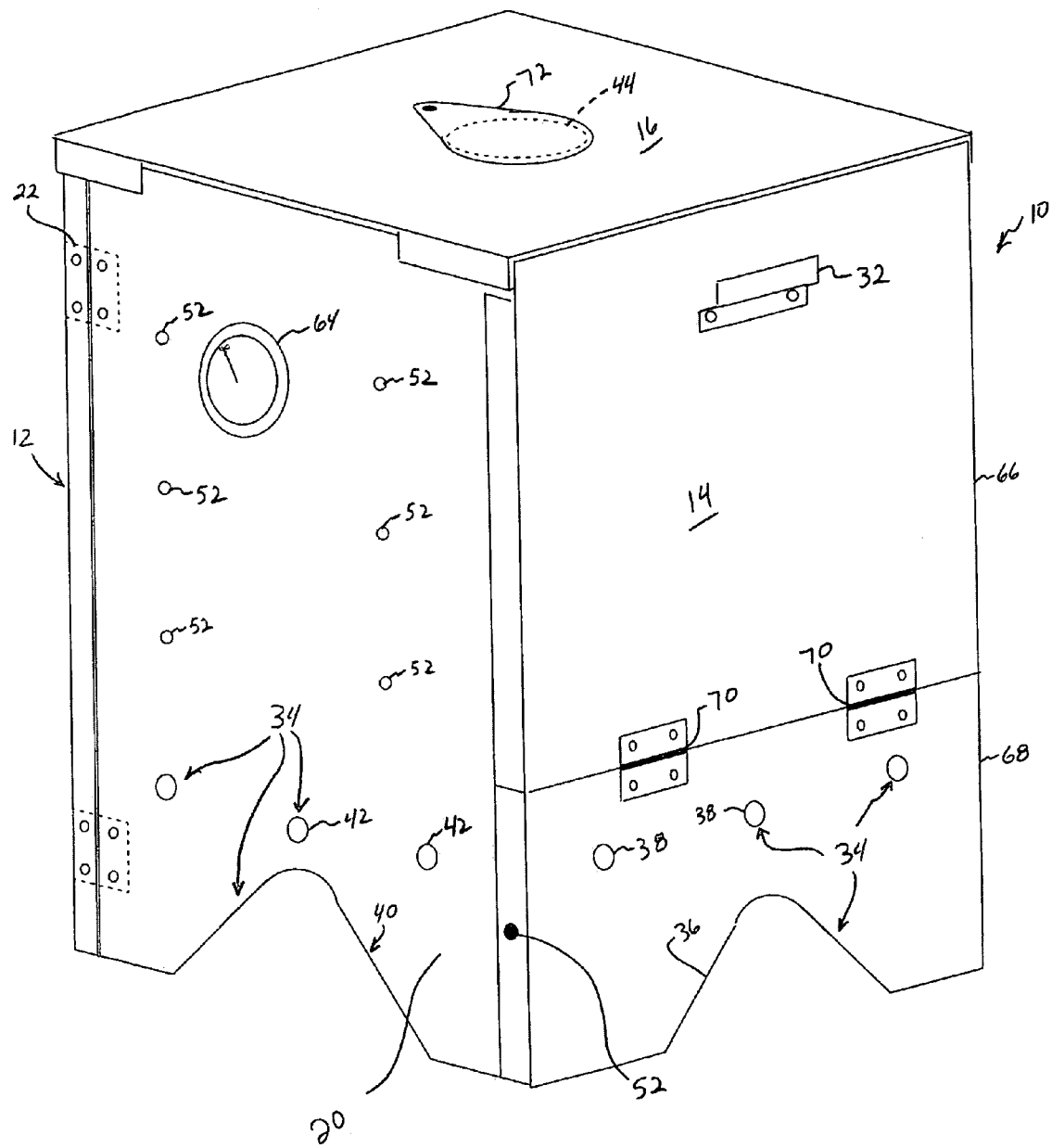
FIG. 1 is a perspective view of the cooking device according to the present invention and being shown in an assembled configuration.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring now to FIGS. 1 through 11, a cooking device 10 according to the present invention is described in greater detail. The cooking device 10 includes a center assembly 12, a front panel 14, and a top panel 16. The center assembly 12 includes a rear panel 18, and a pair of opposing side panels 20 that are hingedly connected to the rear panel 18. As illustrated, it is preferable that a pair of hinges 22 is used to hingedly connect the side panels 20 to the rear panel 18. The hinge 22 is detailed in FIG. 3. The pair of hinges 22 is preferably positioned adjacent an upper portion of each of the side panels 20 and a lower portion of each of the side panels. Those skilled in the art, however, will appreciate that any number of hinges 22 may be used to hingedly connect the pair of opposing side panels 20 to the rear panel 18.

The center assembly 12 is advantageously movable between an expanded position and a collapsed position. In the expanded position, the side panels 20 of the center assembly 12 may be folded outwardly from the rear panel 18, and in the collapsed position, the side panels may be folded inwardly so that the side panels may be positioned adjacent the rear panel. The front panel 14 may be removably connected to the center assembly 12. More specifically, portions of the front panel 14 connect to end portions of the side panels 20 of the center assembly 12. The front panel is preferably defined by a front portion 46, and opposing side portions 48 connected to and extending outwardly from the front portion.

A lower portion of the side portion 48 of the front panel 14 preferably includes a passageway 50 formed therein. Similarly, an adjacent lower portion of each of the side panels 20 of the center assembly 12 includes respective pins 52 connected thereto. The passageways 50 formed on the side portions 48 of the front panel 14 preferably align with the pins 52 on the side panels 20 of the center assembly when the front panel is connected to the center assembly 12. Accordingly, when connecting the front panel 14 to the center assembly 12, a user simply aligns the pins 52 with the passageways 50, and engages the pins with the passageways so that the pins and passageways matingly connect with one another. Those skilled in the art will appreciate that the front panel 14 may be connected to the center assembly 12 by other means as well. for example, fasteners may be used to fasten the front panel to the center assembly.

Figure 2:
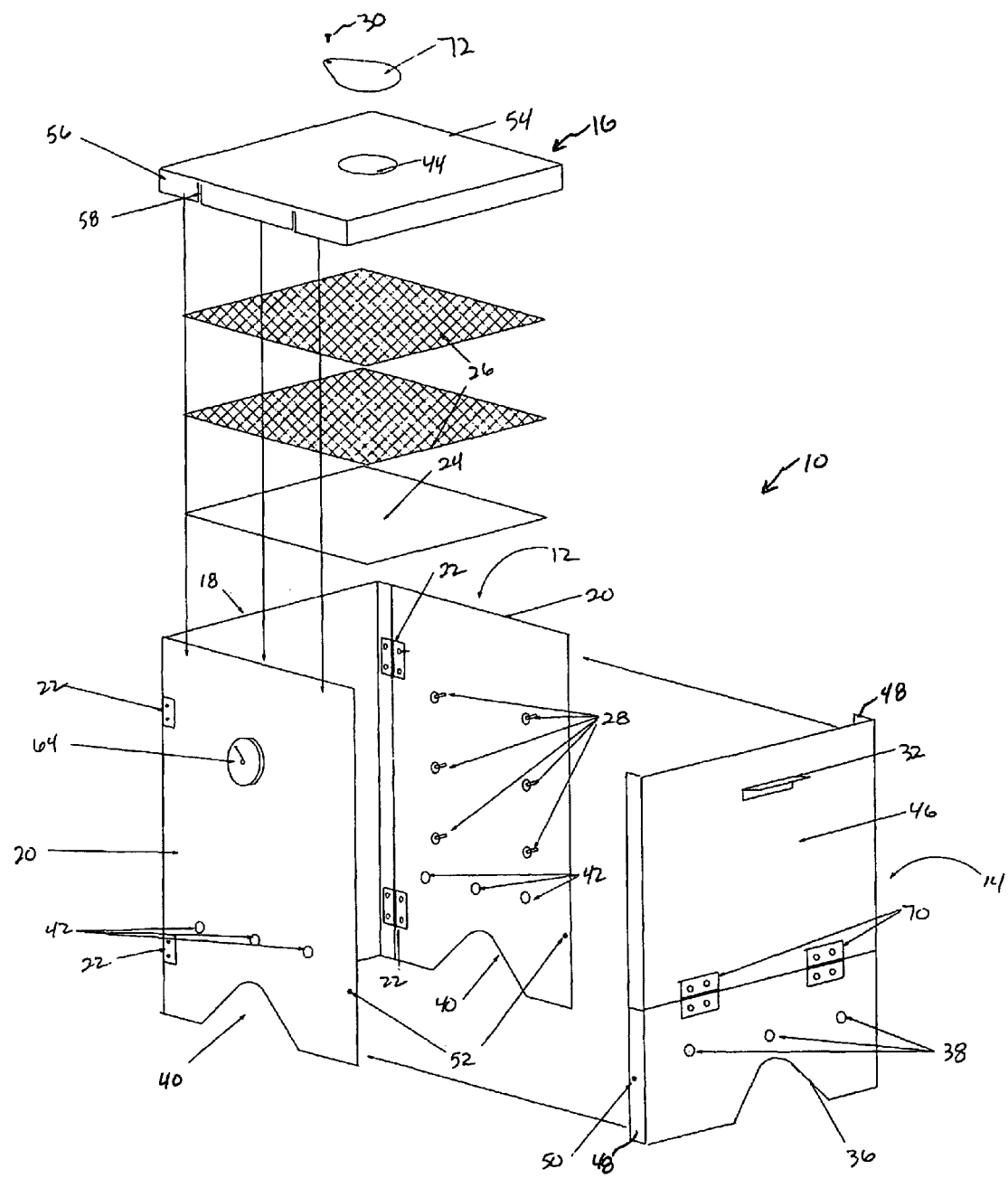
FIG. 2 is an exploded perspective view of the cooking-device illustrated in FIG. 1.

As illustrated, for example, in FIG. 2, the top panel 16 may be removably connected to the center assembly 12. More specifically, the top panel may include a top 54 and side walls 56 extending downwardly therefrom. The side walls 56 of the top panel 16 preferably have slots 58 formed therein. The slots 58 divide the side walls 56 of the top panel 16 into opposing side portions and a medial portion. When the top panel 16 is positioned to overlie the center assembly 12, the medial portion of the side walls 56 of the top panel are preferably positioned adjacent an interior portion of the side panels 20 of the center assembly 12. Further, the opposing side portions of the side walls 56 of the top panel 54 are preferably positioned adjacent an exterior portion of the side panels 20 of the center assembly 12. This configuration advantageously allows the top panel 16 to be securely fastened to the center assembly 12 without the use of fasteners. In other words, the top panel 16 may be connected to the center assembly 12 by simply engaging the side portions of the top panel with upper portions of the center assembly. This configuration advantageously allows a user to readily assemble the cooking device 10.

The cooking device 10 may also include a plurality of supports 28. The plurality of supports may be connected to the side panels 20 of the center assembly 12 using a permanent connection, such as a welded connection, for example.

Those skilled in the art will appreciate, however, that the plurality of supports 28 may be fastened to the side panels 20 of the center assembly 12 using removable connections. As perhaps best illustrated in FIG. 4, each of the supports 28 may include a shaft portion 60 and a flange portion 62 connected to the shaft portion. The shaft portion 60 may include a threaded opening. Further, the side panels 20 of the center assembly 12 may include a plurality of fastener receiving passageways formed therein for receiving a fastener 30 to fasten the supports 28 to an interior portion thereof. The fasteners 30 may be provided by any number of fasteners such as thumb screws, push pins, or any other type of fastener that may be suitable for removably connecting the supports 28 to the center assembly 12.

The cooking device may also include a diffuser plate 24. The diffuser plate 24 may be carried by the center assembly 12 when the center assembly is in the expanded position. The diffuser plate 24 is preferably positioned adjacent a lower portion of the center assembly 12. The supports 28 are preferably arranged along the side panels 20 of the center assembly 12 to support the diffuser plate 24. The diffuser plate 24 is, therefore, preferably carried by the lower most supports 28 that are fastened to the side panels 20 of the center assembly 12.

The cooking device 10 also illustratively includes a plurality of cooking surfaces 26 carried by the center assembly 12. The plurality of cooking surfaces 26 may, for example, be provided by cooking screens as understood by those skilled in the art. The cooking surfaces 26 are preferably positioned to overlie the diffuser plate 24. More specifically, and as perhaps best illustrated in FIG. 2, the cooking device 10 preferably includes at least three sets of supports. As discussed above, the lower most support 28 preferably carries the diffuser plate 24. The remaining supports 28 may be used to carry the cooking surfaces 26. Those skilled in the art will appreciate that the cooking device 10 may include any number of supports 28, and that any number of cooking surfaces 26 may be used to accomplish the goals and features of the present invention. A plurality of cooking surfaces 26 advantageously allows a user multiple options for various cooking needs.

Figure 5:
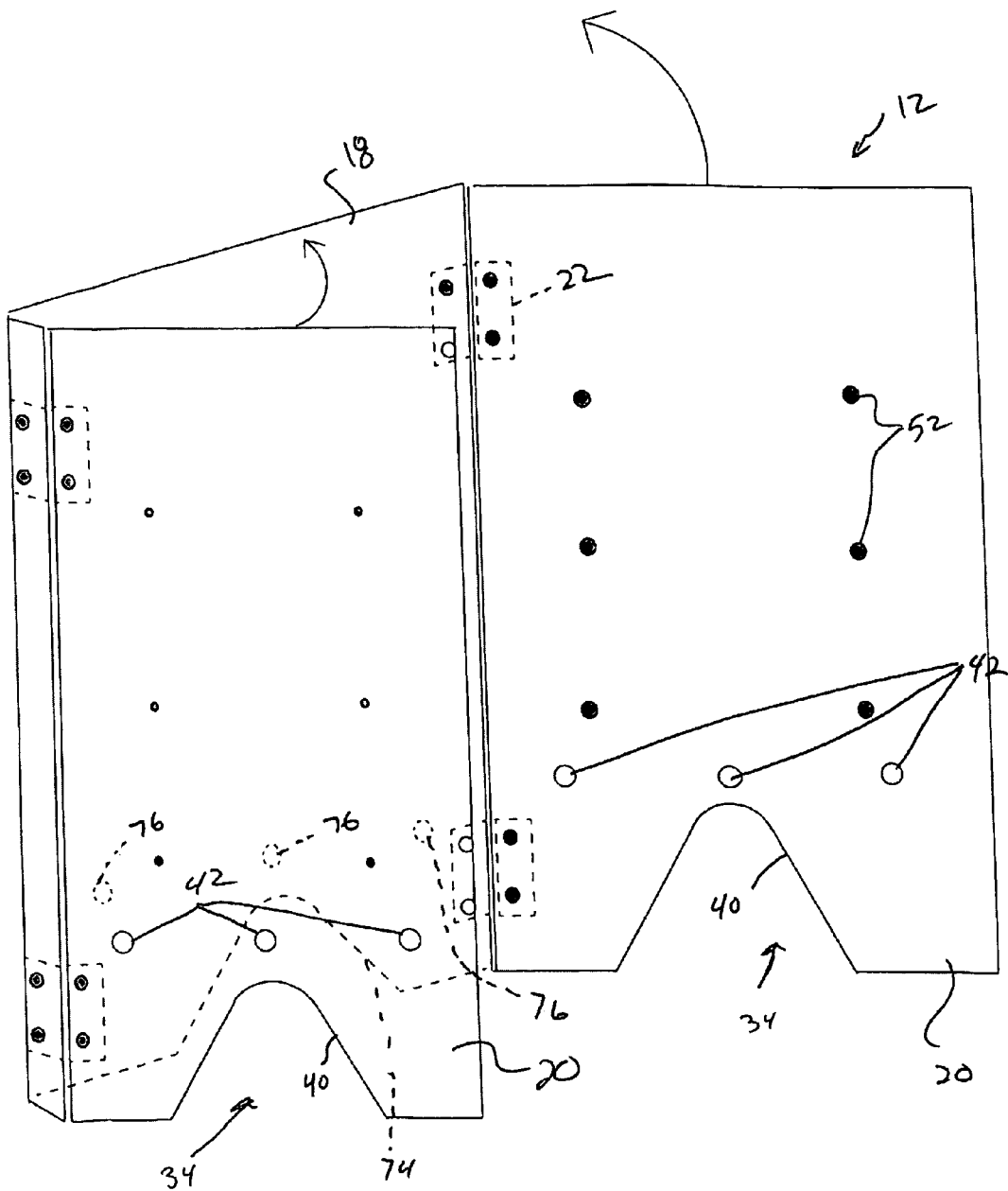
FIG. 5 is a partial perspective view of the center assembly of the cooking device illustrated in FIG. 1 showing the side panels being moved from the expanded position to the collapsed position.
Figure 6:
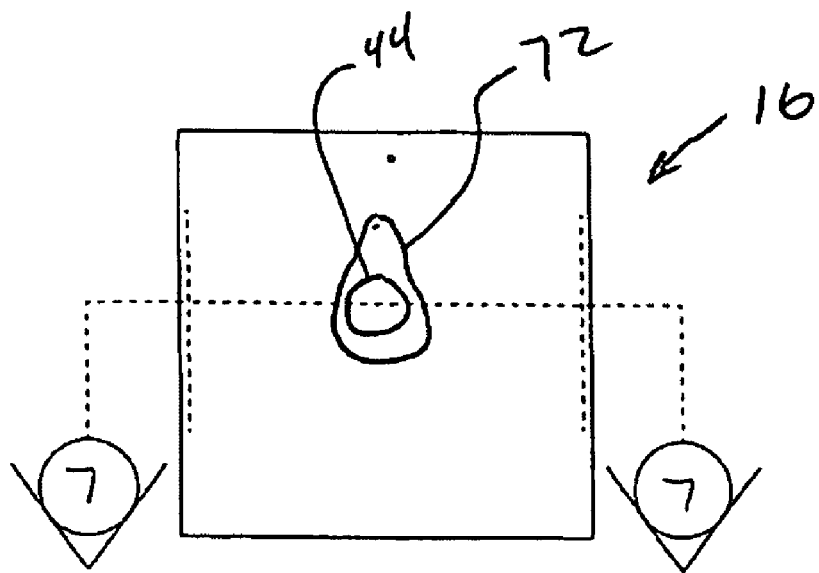
FIG. 6 is a top plan view of the cooking device illustrated in FIG. 1.
Figure 7:
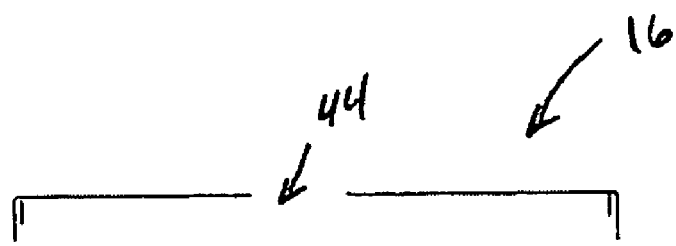
FIG. 7 is a cross sectional view of the cooking device illustrated in FIG. 6 taking through line 7-7.

Referring now additionally to FIG. 5, the center assembly 12 preferably collapses to a substantially flat configuration. More specifically, the side panels 20 of the center assembly 12 may be folded inwardly to be positioned adjacent the rear panel 18 of the center assembly. Accordingly, when in the collapsed position, the center assembly 12 is configured to be substantially flat. As perhaps best illustrated in FIG. 11, the center assembly 12, the front panel 14, the top panel 16, the diffuser plate 24, and the cooking surfaces 26 may be collapsed so that all of the above-referenced components may be transported in a substantially flat configuration. This advantageously allows a user to store the collapsed cooking device 10 in a substantially small area, such as a backpack, for example, As perhaps best illustrated in FIGS. 2, 9-10, and 12, the cooking device 10 may include a handle 32 carried by the front panel 14. The handle 32 advantageously allows a user-to engage a portion of the front panel 14 to move the front panel between opened and closed positions. The cooking device 10 also illustratively includes a thermometer 64 carried by one of the side panels 20 of the center assembly 12. The thermometer 64 is preferably removable so that the temperature within the cooking device 10 may be monitored by the user.

The rear panel 18 and side panels 20 of the center assembly 12, as well as the front panel 14 illustratively Include a plurality of vents 34. More particularly, each of the side panels 20 of the center assembly 12 preferably includes a lower side panel vent 40 and a plurality of upper side panel vents 42. The lower side panel vent 40 is preferably larger than the upper side panel vents 42. As illustrated, the lower side panel vent 40 is preferably positioned adjacent a lower portion of the side panel 20 of the center assembly 12. Further, the upper side panel vents 42 are preferably provided by cylindrical passageways positioned to overlie the lower side panel vent 40.

Further, the rear panel 18 of the center assembly 12 preferably includes a lower rear panel vent 74 and a plurality of upper rear panel vents 76. The lower rear panel vent 74 is preferably larger than the upper rear panel vents 76. As illustrated, the lower rear panel vent 74 is preferably positioned adjacent a lower portion of the rear panel 18 of the center assembly 12. Further, the upper rear panel vents 76 are preferably provided by cylindrical passageways positioned to overlie the lower rear panel vent 74.

Similarly, the front panel 14 of the cooking device 10 includes a lower front panel vent 36 and a plurality of upper front panel vents 38. The lower front panel vent 36 is preferably positioned adjacent a lower portion of the front panel 14, and the upper front panel vents 38 are preferably provided by cylindrical passageways and positioned to overlie the lower front panel vent 36. Those skilled in the art will appreciate that any number of vents 34 may be provided in the front panel 14 and side panels 20, and that the vents may be any shape or size to accomplish the goals and features of the present invention.

Referring now additionally to FIGS. 9 and 10, the front panel 14 of cooking device 10 is described in greater detail. The front panel 14 may include an upper front panel 66 and a lower front panel 68. The upper front panel 66 is preferably hingedly connected to the lower front panel 68. The hinge 70 connecting the upper front panel 66 and lower front panel 68 advantageously allows the upper front panel to be defined as a door. The hinge 70 is preferably positioned adjacent an exterior portion of the front panel 14 so that the upper front panel 66 may open outwardly toward a user.

Figure 14:
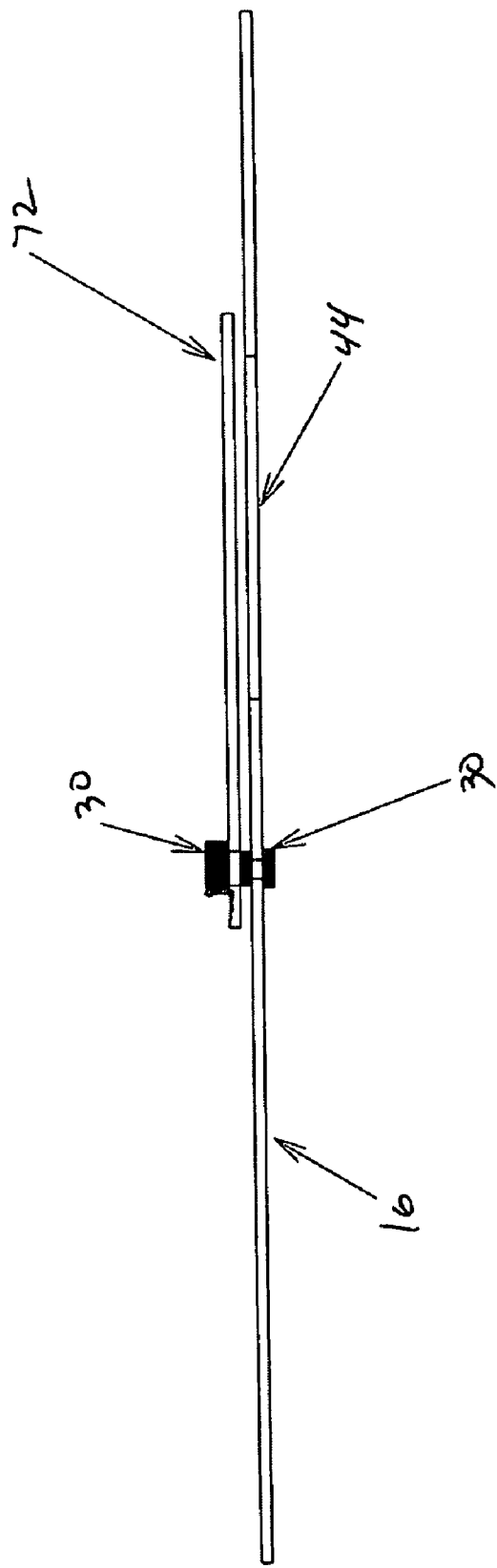
FIG. 14 is a partial side elevation view of a top panel of the cooking device illustrated in FIG. 1 showing a connection between a top vent cover and the top panel.

As perhaps best illustrated in FIGS. 1 and 2, the top panel 16 of the cooking device 10 may also include a top panel vent 44 formed therein. A top vent cover 72 may be positioned to overlie the top panel vent 44. More specifically, the top panel vent 44 is preferably circular, and the top vent cover 72 is also preferably circular and connected to the top panel 16 so that the top vent cover may move between opened and closed positions. The top vent cover 72 may be connected to the top of the top panel 16 using a fastener as illustrated, for example, in FIG. 14. In the closed position, the top vent cover 72 is positioned to overlie the top vent 44 so that no portion of the top vent is exposed. In the opened position, the top vent cover 72 may be positioned so that any portion of the top panel vent 44 may be exposed, providing a vent through the top panel 16.

The cooking device of the present invention 10 advantageously enhances ease of use and longevity by minimizing the number of parts necessary for assembly and use. For example, the plurality of supports 28 preferably include pins that matingly connect to passageways formed in the side panels 20 of the center assembly 12. As disclosed above, the supports 28 may also be permanently connected to the side panels. Similarly, the front panel 14 is preferably connected to the center assembly 12 using pins connected to the center assembly to also advantageously minimize the number of parts necessary to assemble and use the cooking device.

Although not preferred, the present invention contemplates the use of fasteners to fasten the supports 28 to the side panels 20 of the center assembly 12 and to connect the front panel 14 to the center assembly. In such cases, the fasteners may, for example, be provided by thumb screws. Thumb screws are advantageously easily transportable and may be readily replaced should any be lost. Further, thumb screws may advantageously be used to fasten the supports 28 and the front panel 14 to the center assembly 12 without the use of tools.

Figure 3:
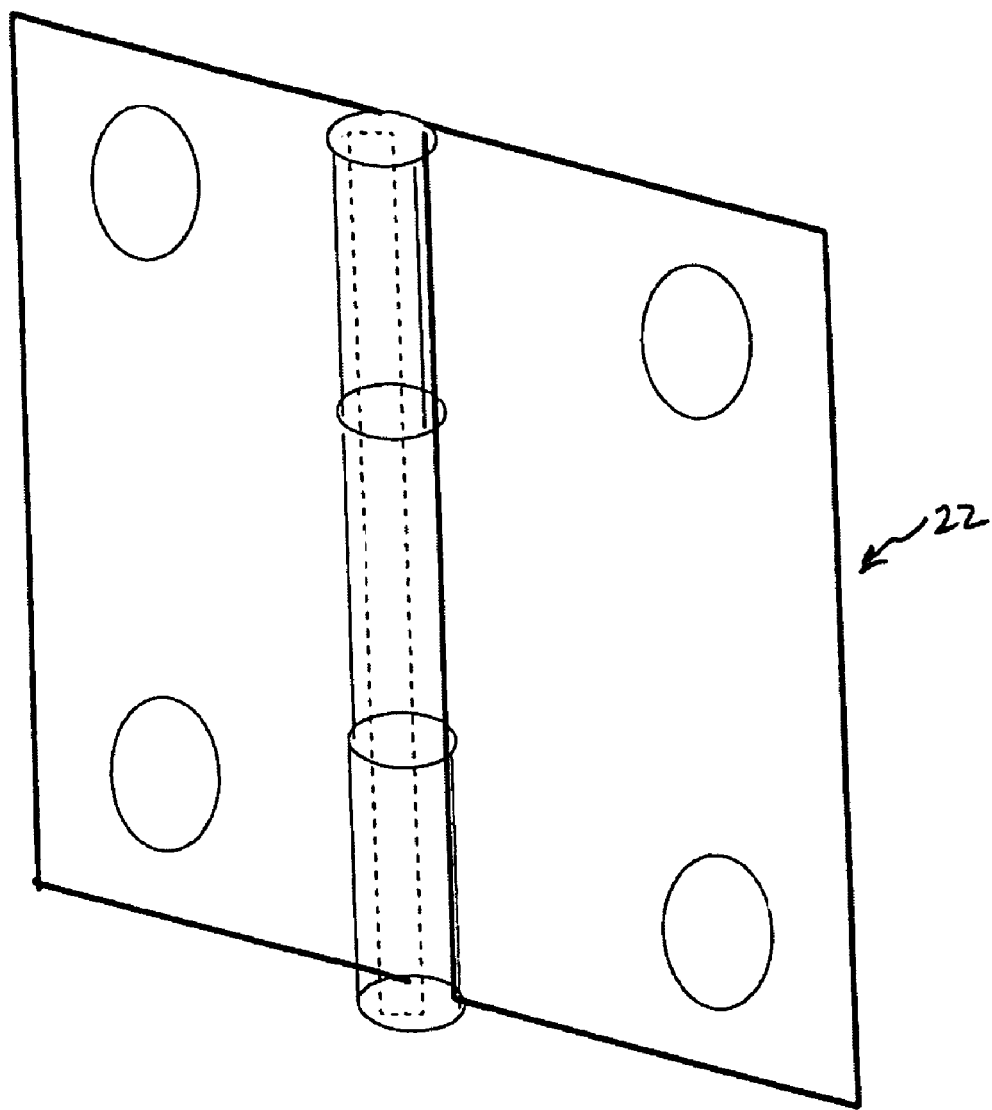
FIG. 3 is a perspective view of a hinge that connected a rear panel of a center assembly of the cooking device to opposing side panels of the center assembly according to the present invention.
Figure 4:
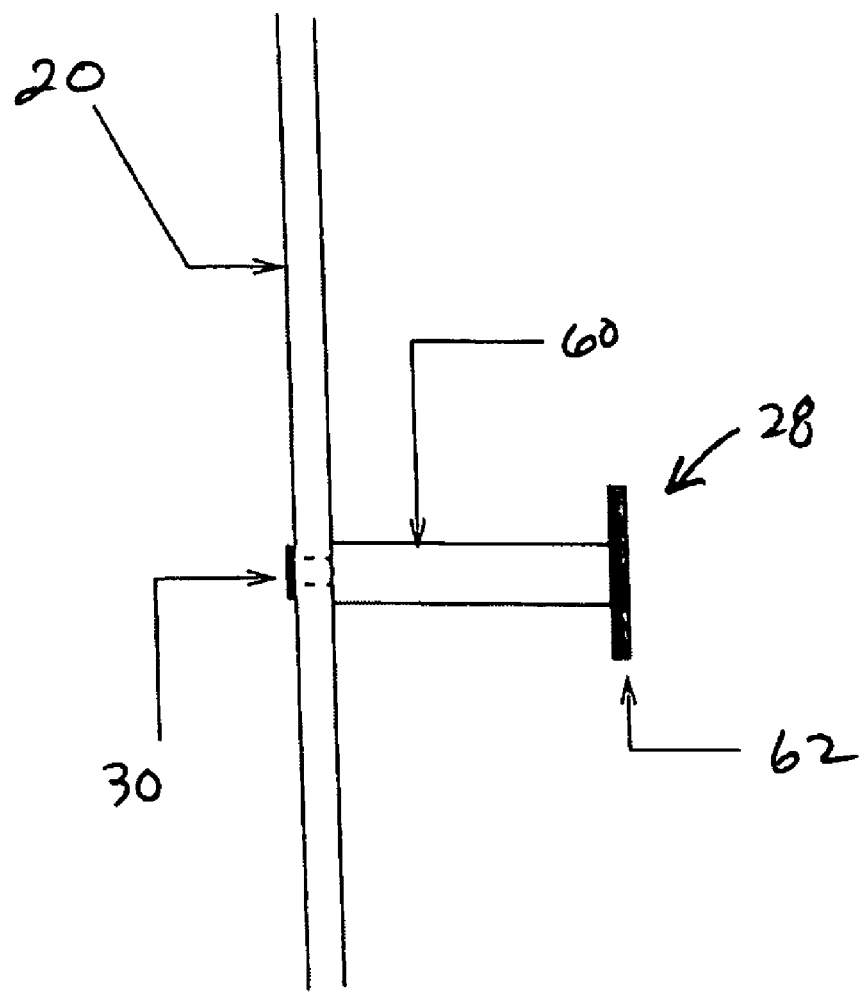
FIG. 4 is a partial side elevation view of the cooking device illustrated in FIG. 1 and showing a support connected to the side panel of the center assembly.

The components of the cooking device 10 are preferably made of an aluminum material. More specifically, the preferred material is 0.025 aluminum alloy, but those having skill in the art will appreciate that any other aluminum alloy bearing similar characteristics may also be used. Those skilled in the art will also appreciate that the use of aluminum is advantageous as it is light in weight. Accordingly, any other similar lightweight material having properties similar to aluminum may also be used to accomplish the goals and features of the present invention. As illustrated in FIG. 3, the hinge 22 holding the side panels 20 of the center assembly 12 to the rear panel 18 of the center assembly is preferably provided by a butterfly hinge. Those skilled in the art, however, will appreciate that any other type of hinge may also be used to accomplish the goals and features of the present invention.

Figure 11:
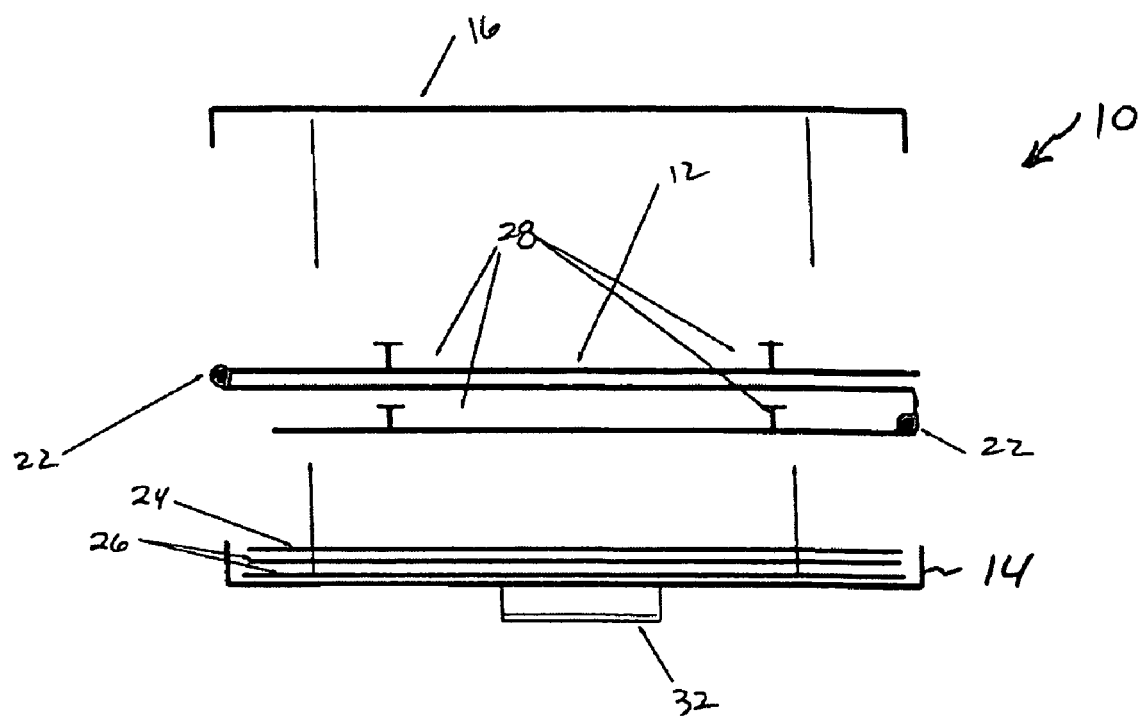
FIG. 11 is an exploded view of the cooking device in the collapsed position and arranged in a substantially flat configuration according to the present invention.

As perhaps best illustrated in FIG. 11, when in the collapsed position, the center assembly 12 is folded to a substantially flat configuration. As also illustrated in FIG. 11, the front panel 14, diffuser plate 24, cooking surfaces 26, center assembly 12, and top panel 18 may all be positioned adjacent one another so that the cooking device 10 may be transported in a substantially flat configuration and only occupy minimal space. More specifically, the preferred arrangement allows the front panel 14 to act as a bottom surface, while the diffuser plate 24 and cooking surfaces 26 may be carried by the front panel. The collapsed center assembly 12 may be positioned to overlie the cooking surfaces 26 and diffuser plate 24, and the top panel 16 may be positioned to overlie the center assembly. Upon arranging the cooking device components as described above, the entire device is ready to be transported in a substantially flat configuration, suitable for a backpack to be used in camping applications.

A method aspect of the present invention is for using a cooking device 10. The method may include moving the center assembly 12 from the collapsed position to an expanded position and connecting the front panel 14 to the center assembly 12 using a plurality of fasteners 30. The method may also include connecting the top panel 16 to upper portions of the center assembly 12. The method may further include disassembling the top panel 16 and the front panel 14 from the center assembly 12, and collapsing the center assembly 12 so that the collapsed center assembly, front panel, top panel, diffuser plate, and cooking surfaces may be transported in a substantially flat configuration.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A cooking device comprising:
    a center assembly including a rear panel and a pair of opposing side panels hingedly connected to said rear panel, said center assembly being moveable between an expanded position and a collapsed position;
    a front panel that is removably connected to said center assembly;
    a top panel removably connected to said center assembly and said front panel;
    a diffuser plate carried by said center assembly when said center assembly is in the expanded position; and
    at least one cooking surface carried by said center assembly when said center assembly is in the expanded position, said at least one cooking surface positioned to overlie said diffuser plate when said center assembly is in the expanded position;
    wherein said center assembly, said front panel, said top panel, said diffuser plate and said at least one cooking surface collapse so that said center assembly, said front panel, said top panel, said diffuser plate and said at least one cooking surface may be transported in a substantially flat configuration;
    wherein said rear panel is formed from a single plate and includes at least one vent formed therein; and wherein the at least one vent formed in said rear panel includes at least one first rear panel vent formed on a bottom end of the rear panel and a plurality of second rear panel vents positioned to overlie the at least one first rear panel vent; and wherein the at least one first rear panel vent and the plurality of second rear panel vents are positioned so that the diffuser plate overlies the at least one first rear panel vent and the plurality of second rear panel vents; and wherein the at least one first rear panel vent is substantially centered on the bottom end of the rear panel and is in the shape of an inverted v-shape with a rounded apex; and wherein the plurality of second rear panel vents are each a substantially circular shape and are substantially equally spaced laterally between a left side of the rear panel and a right side of the rear panel; and wherein said rear panel is unvented above the diffuser plate;
    wherein each panel of said pair of opposing side panels is formed from a single plate and includes at least one vent formed therein; and wherein the at least one vent formed in each of said pair of opposing side panels includes at least one first side panel vent formed on a bottom end of each of said pair of opposing side panels and a plurality of second side panel vents positioned to overlie the at least one first side panel vent; and wherein the at least one first side panel vent and the plurality of second side panel vents are positioned so that the diffuser plate overlies the at least one first side panel vent and the plurality of second side panel vents; and wherein the at least one first side panel vent is substantially centered on the bottom end of each of the opposing pair of side panels and is in the shape of an inverted v-shape with a rounded apex; and wherein the plurality of second side panel vents are each a substantially circular shape and are substantially equally spaced laterally between a left side of each of the pair of opposing side panels and a right side of each of the opposing pair of side panels; and wherein each of said opposing side panels is unvented above the diffuser plate;
    wherein said front panel is formed from a single plate and includes at least one vent formed therein; and wherein the at least one vent formed in said lower front panel includes at least one first front panel vent formed on a bottom end of the lower front panel and a plurality of second front panel vents positioned to overlie the at least one first front panel vent; and wherein the at least one first front panel vent and the plurality of second front panel vents are positioned so that the diffuser plate overlies the at least one first front panel vent and the plurality of second front panel vents; and wherein the at least one first front panel vent is substantially centered on the bottom end of the front panel and is in the shape of an inverted v-shape with a rounded apex; and wherein the plurality of second front panel vents are each a substantially circular shape and are substantially equally spaced laterally between a left side of the front panel and a right side of the front panel; and wherein said front panel is unvented above the diffuser plate; and wherein said top panel includes at least one top panel vent formed therein substantially centered in the top panel; and wherein the top panel vent is a substantially circular shape; and further comprising a respective at least one top vent cover positioned to overlie the at least one top panel vent formed in said top panel; and wherein said respective at least one top vent cover is moveable between an opened position and a closed position.

2. A cooking device according to claim 1 further comprising a respective plurality of supports connected to said respective pair of opposing side panels; and wherein said diffuser plate and said at least one cooking surface are carried by said respective plurality of supports when said center assembly is in the expanded position.

3. A cooking device according to claim 1 further comprising at least one handle carried by said front panel, and a thermometer removably carried by one of said pair of opposing side panels.

4. A cooking device according to claim 1 wherein said front panel comprises an upper front panel and a lower front panel hingedly connected to said upper front panel so that said upper front panel defines a door.

5. A cooking device comprising:
a center assembly including a rear panel and a pair of opposing side panels hingedly connected to said rear panel, said center assembly being moveable between an expanded position and a collapsed position, each of said rear panel and pair of opposing side panels including at least one vent formed therein;
a front panel that is removably connected to said center assembly, said front panel comprising an upper front panel and a lower front panel hingedly connected to said upper front panel so that said upper front panel defines a door, said lower front panel including at least one vent formed therein;
a top panel removably connected to said center assembly and said front panel;
a diffuser plate carried by said center assembly when said center assembly is in the expanded position and a plurality of cooking surfaces carried by said center assembly when said center assembly is in the expanded position, said plurality of cooking surface being positioned to overlie said diffuser plate when said center assembly is in the expanded position;
wherein said center assembly, said front panel, said top panel, said diffuser plate and said plurality of cooking surfaces collapse so that said center assembly, said front panel, said top panel, said diffuser plate and said plurality of cooking surfaces may be transported in a substantially flat configuration;
wherein the rear panel is formed from a single plate; and wherein the at least one vent formed in said rear panel includes at least one first rear panel vent formed on a bottom end of the rear panel and a plurality of second rear panel vents positioned to overlie the at least one first rear panel vent; and wherein the at least one first rear panel vent and the plurality of second rear panel vents are positioned so that the diffuser plate overlies the at least one first rear panel vent and the plurality of second rear panel vents; and wherein the at least one first rear panel vent is substantially centered on the bottom end of the rear panel; and wherein the plurality of second rear panel vents are substantially equally spaced laterally between a left side of the rear panel and a right side of the rear panel; and wherein said rear panel is unvented above the diffuser plate;

wherein each panel of the pair of opposing side panels is formed from a single plate; and wherein the at least one vent formed in each of said pair of opposing side panels includes at least one first side panel vent formed on a bottom end of each of said opposing pair of side panels and a plurality of second side panel vents positioned to overlie the at least one first side panel vent; and wherein the at least one first side panel vent and the plurality of second side panel vents are positioned so that the diffuser plate overlies the at least one first side panel vent and the plurality of second side panel vents; and wherein the at least one first side panel vent is substantially centered on the bottom end of each of the pair of opposing side panels; and wherein the plurality of second side panel vents are substantially equally spaced laterally between a left side of each of the pair of opposing side panels and a right side of each of the pair of opposing side panels; and wherein each of said pair of opposing side panels is unvented above the diffuser plate;

wherein the lower front panel is formed from a single plate, and wherein the at least one vent formed in said lower front panel includes at least one first front panel vent formed on a bottom end of the lower front panel and a plurality of second front panel vents positioned to overlie the at least one first front panel vent; and wherein the at least one first front panel vent and the plurality of second front panel vents are positioned so that the diffuser plate overlies the at least one first front panel vent and the plurality of second front panel vents; and wherein the at least one first front panel vent is substantially centered on the bottom end of the front panel; and wherein the plurality of second front panel vents are substantially equally spaced laterally between a left side of the front panel and a right side of the front panel; and wherein said front panel is unvented above the diffuser plate; and wherein said top panel includes at least one top panel vent formed therein substantially centered in the top panel; and wherein the top panel vent is a substantially circular shape; and further comprising a respective at least one top vent cover positioned to overlie the at least one top panel vent formed in said top panel; and wherein said respective at least one top vent cover is moveable between an opened position and a closed position.

6. A cooking device according to claim 5 further comprising a respective plurality of supports connected to said respective pair of opposing side panels; and wherein said diffuser plate and said plurality of cooking surfaces are carried by said respective plurality of supports when said center assembly is in the expanded position.

7. A cooking device according to claim 5 further comprising a plurality of fasteners to fasten said front panel to portions of said center assembly and to fasten said respective plurality of supports to said respective side panels.

8. A method of using a cooking device, the cooking device comprising a center assembly including a rear panel and a pair of opposing side panels hingedly connected to the rear panel, a front panel that is removably connected to the center assembly, a top panel that is removably connected to the center assembly and the front panel, at least one diffuser plate, and at least one cooking surface, wherein each of the rear panel, each panel of the panel of the pair of opposing side panels, and the front panel is formed from a single plate, wherein each of the opposing side panels, the rear panel and the front panel is unvented above the at least one diffuser plate, wherein the rear panel, the pair of opposing side panels, the front panel and the top panel each includes at least one vent formed therein, wherein the at least one vent formed in the rear panel includes at least one first rear panel vent formed on a bottom end of the rear panel substantially centered on the bottom end thereof in the shape of an inverted v-shape with a rounded apex, wherein the at least one vent formed in the rear panel includes a plurality of second rear panel vents positioned to overlie the at least one first rear panel vent substantially equally spaced laterally between a left side of the rear panel and a right side of the rear panel each with a substantially circular shape, wherein the at least one vent formed in each of the pair of opposing side panels includes at least one first side panel vent formed on a bottom end of each of the pair of opposing side panels substantially centered on the bottom end thereof in the shape of an inverted v-shape with a rounded apex, wherein the at least one vent formed in each of the side panels includes a plurality of second side panel vents positioned to overlie the at least one first side panel vent substantially equally spaced laterally between a left side of each of the side panels and a right side of each of the side panels each with a substantially circular shape, wherein the at least one vent formed in the front panel includes at least one first front panel vent formed on a bottom end of the front panel substantially centered on the bottom end thereof in the shape of an inverted v-shape with a rounded apex, wherein the at least one vent formed in the front panel includes a plurality of second front panel vents positioned to overlie the at least one first front panel vent substantially equally spaced laterally between a left side of the front panel and a right side of the front panel each with a substantially circular shape, and wherein the at least one top panel vent is of a substantially circular shape and is substantially centered in the top panel with a respective at least one top vent cover positioned to overlie the at least one top panel vent moveable between an opened position and a closed position, the method comprising:

moving the center assembly from a collapsed position to an expanded position, the collapsed position being defined as the pair of opposing side panels being folded inwardly to be adjacent the rear panel, and the extended position being defined as the pair of opposing side panels being extended outwardly to be positioned substantially normal to the rear panel;

connecting the front panel to the center assembly;

connecting the top panel to upper portions of the center assembly; and disassembling the top panel and front panel from the center assembly;

collapsing the center assembly and arranging the collapsed center assembly, the front panel and the top panel in a substantially flat configuration.

9. A method according to claim 8 further comprising connecting a plurality of supports to interior portions of the opposing side panels, the supports being positioned to support the at least one diffuser plate and the at least one cooking surface when the center assembly is in the extended position.

10. A method according to claim 8 wherein the front panel comprises an upper front panel and a lower front panel hingedly connected to the upper front panel so that the upper front panel defines a door.

11. A method according to claim 10 further comprising engaging a handle on the door to move the upper front panel between an opened position and a closed position.

12. A cooking device according to claim 5 wherein the at least one first rear panel vent is in the shape of an inverted v-shape with a rounded apex and wherein the plurality of second rear panel vents are each a substantially circular shape.

13. A cooking device according to claim 5 wherein the at least one first side panel vent is in the shape of an inverted v-shape with a rounded apex and wherein the plurality of second side panel vents are each a substantially circular shape.

14. A cooking device according to claim 5 wherein the at least one first front panel vent is in the shape of an inverted v-shape with a rounded apex and wherein the plurality of second front panel vents are each a substantially circular shape.

* * * * *